Aug. 9, 1938.  E. D. FEAR ET AL  2,126,377
INDICATING SCALE
Filed Jan. 28, 1937  2 Sheets-Sheet 1

INVENTORS
Ernest D. Fear
Thomas L. Siebenthaler
BY
ATTORNEY

Aug. 9, 1938.   E. D. FEAR ET AL   2,126,377
INDICATING SCALE
Filed Jan. 28, 1937   2 Sheets-Sheet 2

INVENTORS
Ernest D. Fear
Thomas L. Siebenthaler
BY
ATTORNEY

Patented Aug. 9, 1938

2,126,377

UNITED STATES PATENT OFFICE 2,126,377

INDICATING SCALE

Ernest D. Fear and Thomas L. Siebenthaler, Kansas City, Mo., assignors to De-Raef Corporation, Kansas City, Mo., a corporation of Missouri Application January 28, 1937, Serial No. 122,762

3 Claims. (Cl. 265—58)

Our invention relates to indicating scales and more particularly to a scale adapted to weigh packages of predetermined weight with visual indicating means for indicating overweight or underweight.

In large scales adapted to weigh masses of 25 pounds or more, the weight of the parts is such that no difficulty is experienced in obtaining an indicating scale, that is, one which will sound alarm signals or close electrical circuits for indicating lights. In small scales, however, the associated parts are necessarily light in weight and must operate with a minimum of friction and the arrangement must be such that a delicate balance is obtained in order to provide a scale of the desired sensitivity.

Frequently articles are sold in packages of predetermined weight. For example, butter is retailed in prints of quarter pound, half pound, or a pound in weight. If the packages are underweight, the customers will not obtain full weight and difficulty is apt to arise. On the other hand, if the packages are overweight, a distinct economic loss is occasioned.

Taking butter by way of example, machines are available for making butter prints. These machines are adapted to give prints of approximately the desired weight. The butter print machines, however, are not so accurate that their output can be retailed without checking, which involves weighing each print separately.

This obviously necessitates considerable expenditure of labor and requires time, especially if an ordinary scale is used in which it is necessary to permit the pointer to come to rest.

One object of our invention is to provide an indicating scale which is adapted to indicate overweight or underweight by means of visual signals.

Another object of our invention is to provide a novel scale construction.

Other and further objects of our invention will appear from the following description.

In the accompanying drawings which form part of the instant specification and are to be read in conjunction therewith and in which like reference numerals are used to indicate like parts in the various views.

Figure 2:
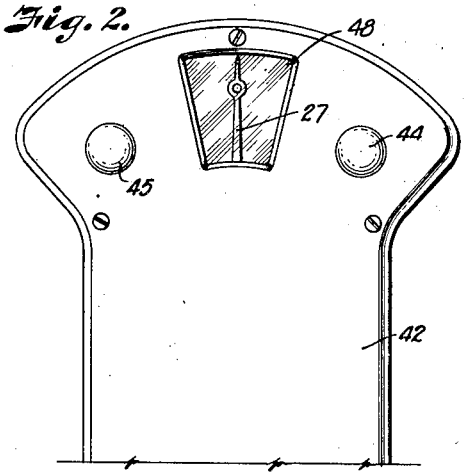
Figure 2 is a fragmentary elevation of the upper part of the scale shown in Figure 1.

In general, our invention contemplates the provision of a beam balanced against a spring. A link is provided with a rack engaging a pinion mounted upon a pointer shaft. The link is connected to the beam so that movement thereof will move the rack to rotate the pointer shaft and hence the pointer. The pointer shaft carries a beam which, in turn, supports contact members, the arrangement being such that the contact members are adapted to complete respective circuits to indicating means, as for example differently colored incandescent lights. The scale construction is such that the weighing platform is constrained to move with parallel motion by means of linkage so that the same weight will be registered regardless of the position of the mass on the weighing platform.

More particularly, referring now to the drawings, a scale proper comprises a base chamber 1 in which are mounted bearings 2 for the shaft 3 of the main beam 4. The main beam is secured to shaft 3 which is provided with the usual knife edges and rests in agate bearings to minimize friction. A weighing platform 5 is supported by means of column 6 on a platform supporting beam 7, the ends of which are provided with bearing members 8 and 9 provided with the usual agate bearings. The bearing members 8 and 9 are adapted to be supported on a knife edge 10 which is carried by the main beam 4. To the platform supporting beam 7 is secured a link 11. To a suitable support 12, secured to the housing 1, we fasten a link 13. Link 11 and link 13 are of exactly the same length. These links are connected by a pair of links 14 and 15, giving a parallel motion so that movement of the platform and its supporting beam up and down will cause it to move with platform supporting standard 6 vertically. This enables substantially a true reading to be obtained, regardless of the position on the platform 5 of the mass being weighed. The outer end of the beam 4 is provided with a counterweight 16 to act against the weight of the longer arm of the beam 4, the weight of the platform supporting beam and associated parts and the weight of the indicating equipment. Secured to the end of beam 4 is a spring connecting member 17 to which a spring 18 is secured. The other end of spring 18 is secured to one arm 19 of a bell crank lever 20 which is pivoted at 21. The other arm of the bell crank lever is adapted to be engaged by adjusting screw 22 for changing the spring tension. A link 23 is also secured to member 17, the upper end of the link 23 being formed with a rack 24 which engages a pinion 25 which is keyed to pointer shaft 26. A pair of pointers 27 and 28 are secured to the pointer shaft 26. Also secured to the pointer shaft 26 is a bushing 29 made of any suitable insulating material. To the bushing 29 is secured a contact supporting beam 30 made of conducting material.

Figure 5:
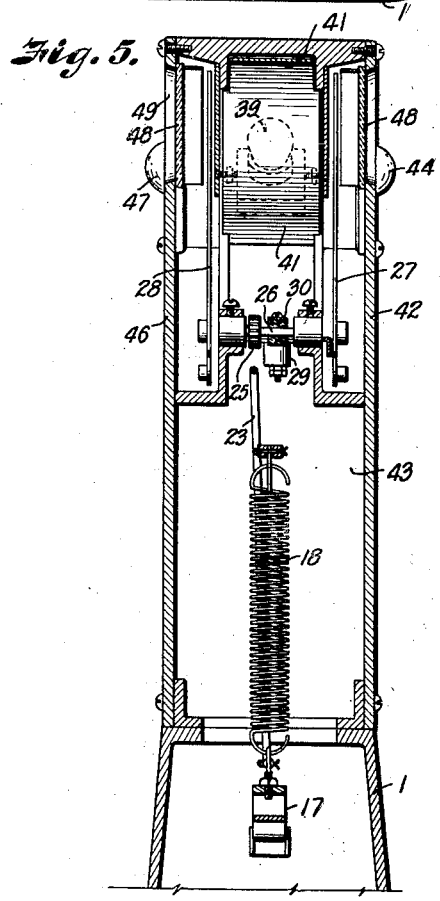
Figure 5 is a sectional view taken on a line 5—5 of Figure 1.

Adjustably carried by contact supporting beam 30 are contact members 31 and 32, the lower ends of which are adapted to complete circuits through pools of mercury 33 and 34 which are held in reservoirs 35 and 36 respectively, which reservoirs are made of insulating material. The return circuits completed by contact members 31 and 32 are made through conductors 37 and 38 as can more readily be seen by reference to the wiring diagram shown in Figure 6. One of the contact members 31 is adapted to complete a circuit through an incandescent lamp 39. The other contact member 32 is adapted to complete a circuit through incandescent lamp 40. Incandescent lamp 39 may be tinted red or any other desired color, while incandescent lamp 40 may be tinted green or some other distinctive color. A light guard 41 is fitted so that when either of the incandescent lamps 39 or 40 light, an indication will not be seen in the region of the other incandescent light. A cover plate 42 is secured to the housing 43 which protects and supports the indicating assembly. A pair of lenses 44 and 45 are fitted in the cover plate. These lenses may be clear glass if colored incandescent lamps are used, or tinted if clear incandescent lamps are used at 39 and 40. The other side of the housing 43 is closed with a cover plate 46 carrying a pair of similar lenses, one of which is shown in Figure 5 at 47. The cover plate 42 is fitted with an aperture 48 through which the pointer 27 may be viewed. The cover plate 46 is provided with an aperture 49 through which the pointer 29 may be viewed. In this manner, it will be seen that two operators may employ the scales standing on opposite sides thereof and alternately weighing the masses being handled, thus speeding up the work and enlarging upon the convenience of the scale. A number of different auxiliary platforms 50 are provided. The arrangement is such that with one auxiliary platform 50, for example, the pointer will be in the position shown when a butter print 51 weighing exactly a quarter of a pound is on the platform.

Figure 1:
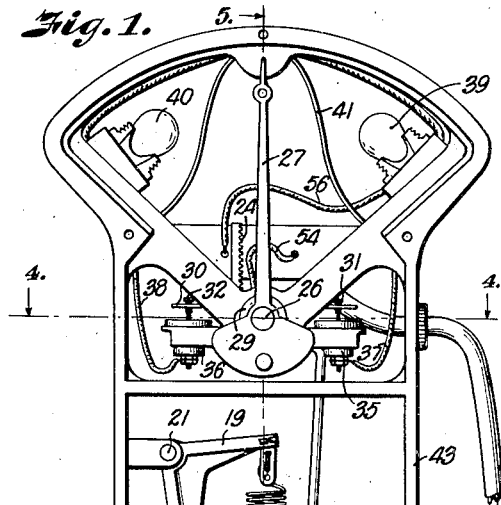
Figure 1 is a sectional elevation of a scale showing one embodiment of our invention.
Figure 3:
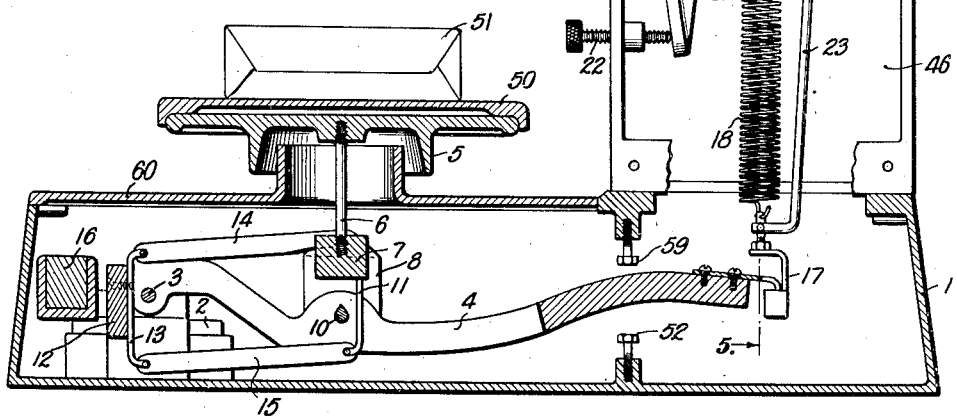
Figure 3 is an enlarged fragmentary sectional elevation showing details of the indicator structure, taken on line 3—3 of Figure 4.
Figure 3:
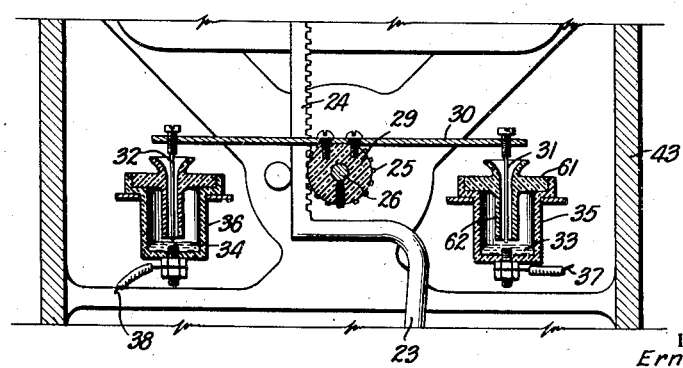
Figure 4:
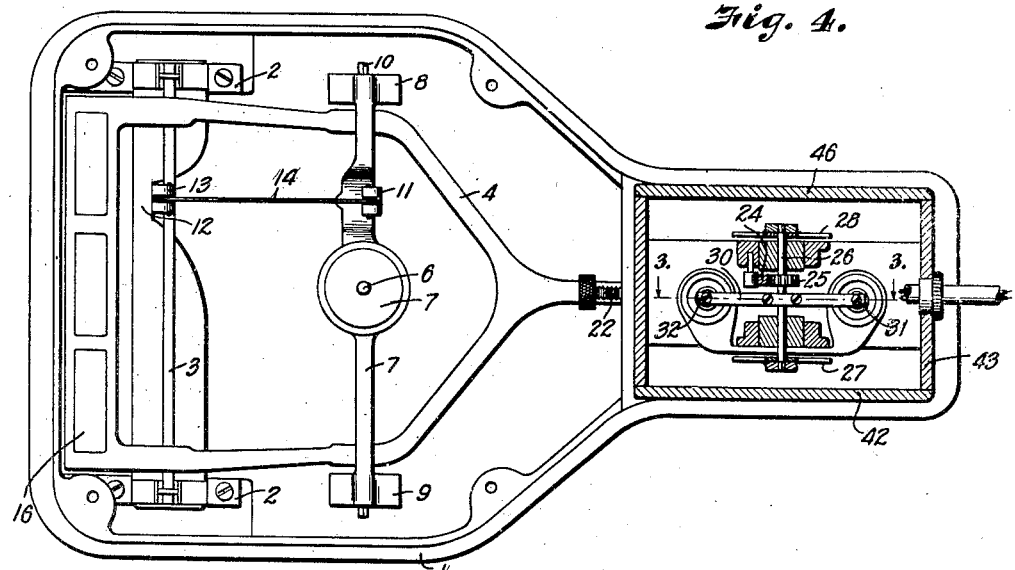
Figure 4 is a sectional plan view taken on a line 4—4 of Figure 1.
Figure 6:
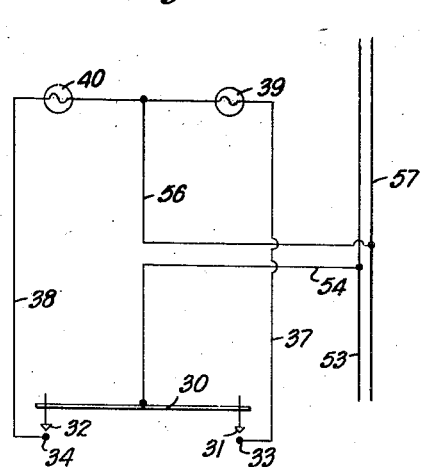
Figure 6 is a diagrammatic view showing the electrical connections used.

When the pointer is in the position shown in Figure 1, the contact supporting beam 30 will be in the position shown in Figure 3, that is with both contact points out of contact with the pools of mercury and, in this position, neither lamp 39 nor 40 will be lit. If the butter print is removed from the platform the tension of spring 18 is such that it will pull the outer end of beam 4 upwardly, moving link 23 upwardly, moving rack 24 upwardly, rotating pointer shaft 26 in a clockwise direction as viewed in Figure 3, thus moving the upper end of pointer 27 to the right as viewed in Figure 1 until the upper surface of beam 4 strikes adjustable stop member 59. When this occurs, contact is made between contact member 31 and the pool of mercury 33. Referring now to Figure 6, when contact member 31 is in contact with the pool of mercury 33, current will flow from main 53 through conductor 54, through contact beam 30, through contact point 31, through pool of mercury 33, through conductor 37, through incandescent lamp 39, through conductor 56 to the other side of the line 57, thus lighting incandescent lamp 39. This lamp is either tinted red or provided with red lenses 44.

Should butter print 51 weigh less than a quarter of a pound when placed upon the platform, the red light will not be extinguished and the operator will immediately know that the print weighs less than a quarter of a pound. Should, however, the print weigh more than a quarter of a pound, the additional weight moving the beam 4 downwardly against the action of spring 18 and rotating pointer shaft 26 counterclockwise through the arrangement just described, will bring contact point 32 into contact with the pool of mercury 35, thus completing a circuit through main 53 through conductor 54, through contact arm 30, through contact point 31, through mercury pool 35, through conductor 38, through incandescent lamp 40, through return conductor 56 to the other side of the line 57, thus lighting incandescent lamp 40 which is either tinted green or any other suitable color, or is provided with a green lens 45.

Upon placing the butter print on the scale, should the operator note that the green light burns steadily, he immediately knows that the print being weighed is overweight. Only when both lights are extinguished does the print weigh the desired amount. Minor adjustments can be readily made by means of adjusting screw 22 so that the scale will be accurate within a small fraction of an ounce. The housing 1 is adapted to be filled with oil so that all moving parts will be protected against corrosion. When heavier prints are to be weighed, a lighter auxiliary platform 50 is employed. To limit the downward motion of the beam 40, we provide an adjustable limit stop 52. The housing is provided with a cover plate 60 which is adapted to be readily removed for making adjustments or repairs.

It will be seen that we have accomplished the objects of our invention. We have provided a scale construction for weighing masses under 25 pounds which is provided with visual indicating means for indicating overweight or underweight without sacrificing sensitivity. The construction is such that the contact points are carried without suffering a loss in sensitivity. By placing the contact supporting beam upon the pointer shaft, a balanced couple is achieved. It will be noted that the mercury cups 35 are provided with cover members 61 having downwardly extending elongated sleeves 62 through which the contact members extend. This construction enables the transportation of the scale without danger of losing mercury since, if the scale is inverted, the elongated sleeve will extend above the level of the mercury with the cup in inverted position. It will be observed that the length of beam 30 is such that the movement of the pointer shaft 26 is magnified so that a small displacement of the pointer will cause the contact points to contact the mercury. The contact points may be made out of platinum or other non-corrosive material to withstand arcing. Any suitable number of auxiliary platforms 50 may be provided so that the scale can be made to weigh, for example, one quarter pound, one half pound, one pound, or two pound masses without changing the adjusting of the scale, by simply providing the proper auxiliary platform.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. In a scale, a beam, a pointer shaft, a pinion on said pointer shaft, a rack engaging said pinion, a link connecting said rack to said beam whereby movement of said beam is adapted to rotate said pointer shaft, an arm, means for mounting said arm on said pointer shaft, a pair of contact members carried by said arm, a pair of incandescent lamps, circuits for said lamps adapted to be completed by said contact points, the construction being such that when said pointer is in a predetermined position, neither of said circuits will be completed and, at other times, one or the other of said circuits will be completed to indicate overweight or underweight.

2. In a scale, a beam, means for mounting a platform on said beam, a spring against which weight placed upon said platform is adapted to act, a pointer shaft, a pinion mounted on said pointer shaft, a rack engaging said pinion, a link connecting said rack to said beam whereby movement of said beam is adapted to rotate said pointer shaft, the spring tension being such that when a predetermined weight is placed upon said platform, the pointer shaft will be in a predetermined position, an insulating bushing carried by said pointer shaft, an arm positioned centrally thereof on said bushing, a pair of electrical contact points carried by said arm, a pair of incandescent lamps, respective circuits for said lamps adapted to be completed by respective contact points when said pointer shaft is not in said predetermined position, the construction being such that one of said lamps is adapted to indicate underweight and the other of said lamps is adapted to indicate overweight.

3. In a scale, a beam, a platform, means carried by said beam for supporting said platform, a spring for balancing said beam, a pointer shaft, a pinion secured to said pointer shaft, a rack engaging said pinion, a link for communicating movement of said beam to said rack, a link secured to said platform supporting means, a second link of equal length secured to the stationary part of said scale and a pair of links of equal length secured to said first mentioned links for biasing said platform supporting means to move in parallel motion.

ERNEST D. FEAR.
THOMAS L. SIEBENTHALER.